US 6,553,314 B2

(12) United States Patent
Kriegshauser et al.

(10) Patent No.: US 6,553,314 B2
(45) Date of Patent: *Apr. 22, 2003

(54) METHOD FOR DETERMINATION OF APPARENT RESISTIVITIES OF ANISOTROPIC RESERVOIRS

(75) Inventors: Berthold F. Kriegshauser, Houston, TX (US); Otto N. Fanini, Houston, TX (US); Pravin Gupta, Roorkie (IN); Liming Yu, Stafford, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/244,960

(22) Filed: Sep. 17, 2002

(65) Prior Publication Data
US 2003/0018434 A1 Jan. 23, 2003

Related U.S. Application Data

(63) Continuation of application No. 09/676,097, filed on Sep. 29, 2000, now Pat. No. 6,466,872
(60) Provisional application No. 60/164,055, filed on Nov. 8, 1999.

(51) Int. Cl.$^7$ .................................................. G01V 3/38
(52) U.S. Cl. ............................................................ 702/7
(58) Field of Search .................................... 702/7, 10, 11, 702/12, 13; 324/338, 339, 343

(56) References Cited

U.S. PATENT DOCUMENTS 5,446,654 A * 8/1995 Chemali et al. ................ 702/7
5,867,806 A * 2/1999 Strickland et al. ............. 702/7

* cited by examiner

Primary Examiner—Donald E. McElheny, Jr.
(74) Attorney, Agent, or Firm—Madan, Mossman & Sriram, P.C.

(57) ABSTRACT

Shoulder corrections are applied to measurements obtained from a multi-component electromagnetic logging tool. An anisotropic resistivity model is obtained using the shoulder corrected data. The process is iterated until a good match is obtained between the shoulder corrected data and the model output.

13 Claims, 3 Drawing Sheets

METHOD FOR DETERMINATION OF APPARENT RESISTIVITIES OF ANISOTROPIC RESERVOIRS

CROSS-REFERENCES TO RELATED APPLICATIONS

This application is a continuation of U.S. patent application Ser. No. 09/676,097 filed on Sep. 29, 2000, now U.S. Pat. No. 6,466,872, which claimed priority from United States Provisional Patent Application Ser. No. 60/164,055 filed on Nov. 8, 1999.

BACKGROUND OF THE INVENTION

1. Field of the Invention

The invention is related generally to the field of interpretation of measurements made by well logging instruments for the purpose of determining the properties of earth formations. More specifically, the invention is related to methods for correcting measurements made by multi-component induction or propagation sensors for shoulder bed and borehole effects.

2. Background of the Art

Electromagnetic induction and wave propagation logging tools are commonly used for determination of electrical properties of formations surrounding a borehole. These logging tools give measurements of apparent resistivity (or conductivity) of the formation that when properly interpreted are diagnostic of the petrophysical properties of the formation and the fluids therein.

The physical principles of electromagnetic induction resistivity well logging are described, for example, in, H. G. Doll, Introduction to Induction Logging and Application to Logging of Wells Drilled with Oil Based Mud, Journal of Petroleum Technology, vol. 1, p. 148, Society of Petroleum Engineers, Richardson Tex. (1949). Many improvements and modifications to electromagnetic induction resistivity instruments have been devised since publication of the Doll reference, supra. Examples of such modifications and improvements can be found, for example, in U.S. Pat. Nos. 4,837,517; 5,157,605 issued to Chandler et al, and U.S. Pat. No. 5,452,761 issued to Beard et al.

A limitation to the electromagnetic induction resistivity well logging instruments known in the art is that they typically include transmitter coils and receiver coils wound so that the magnetic moments of these coils are substantially parallel only to the axis of the instrument. Eddy currents are induced in the earth formations from the magnetic field generated by the transmitter coil, and in the induction instruments known in the art these eddy currents tend to flow in ground loops which are substantially perpendicular to the axis of the instrument. Voltages are then induced in the receiver coils related to the magnitude of the eddy currents. Certain earth formations, however, consist of thin layers of electrically conductive materials interleaved with thin layers of substantially non-conductive material. The response of the typical electromagnetic induction resistivity well logging instrument will be largely dependent on the conductivity of the conductive layers when the layers are substantially parallel to the flow path of the eddy currents. The substantially non-conductive layers will contribute only a small amount to the overall response of the instrument and therefore their presence will typically be masked by the presence of the conductive layers. The non-conductive layers, however, are the ones which are typically hydrocarbon-bearing and are of the most interest to the instrument user. Some earth formations which might be of commercial interest therefore may be overlooked by interpreting a well log made using the electromagnetic induction resistivity well logging instruments known in the art.

U.S. Pat. No. 5,999,883 issued to Gupta et al, (the "Gupta patent"), the contents of which are fully incorporated here by reference, discloses a method for determination of the horizontal and vertical conductivity of anisotropic earth formations. Electromagnetic induction signals induced by induction transmitters oriented along three mutually orthogonal axes are measured. One of the mutually orthogonal axes is substantially parallel to a logging instrument axis. The electromagnetic induction signals are measured using first receivers each having a magnetic moment parallel to one of the orthogonal axes and using second receivers each having a magnetic moment perpendicular to a one of the orthogonal axes which is also perpendicular to the instrument axis. A relative angle of rotation of the perpendicular one of the orthogonal axes is calculated from the receiver signals measured perpendicular to the instrument axis. An intermediate measurement tensor is calculated by rotating magnitudes of the receiver signals through a negative of the angle of rotation. A relative angle of inclination of one of the orthogonal axes which is parallel to the axis of the instrument is calculated, from the rotated magnitudes, with respect to a direction of the vertical conductivity. The rotated magnitudes are rotated through a negative of the angle of inclination. Horizontal conductivity is calculated from the magnitudes of the receiver signals after the second step of rotation. An anisotropy parameter is calculated from the receiver signal magnitudes after the second step of rotation. Vertical conductivity is calculated from the horizontal conductivity and the anisotropy parameter.

Shoulder bed corrections related to the effect of formations above and below the depth being evaluated also have to be applied to the data. Methods for making these corrections to data acquired with conventional logging tools are well known in the art.

For example, U.S. Pat. No. 5,446,654 to Chemali teaches the conversion of a resistivity log as a function of well depth into a rectangularized curve so that the interfaces of the adjacent strata are located, and by a suitable number of iterations, a correction factor is applied. The corrected rectangular log is obtained with a correction coefficient computed at each depth. For each computation, the impact of all the strata within a specified depth window is considered, while strata beyond that window are simplified by representing the strata beyond the window with single equivalent bed values to reduce the number of computations required. This then provides a resistivity log which is substantially free of shoulder bed effect.

The method of U.S. Pat. No. 5,867,806 to Strickland et al. selects one or more control depths at one or more locations of each of a plurality of detected beds in the formation. The method then estimates the resistivity of each bed only at the selected control depths to produce an estimated resistivity of the beds. The method then computes a simulated log value at each control depth using a current estimate of the resistivity of the beds. The computed simulated log is then compared to the actual log data at each control depth, and the resistivity of each bed is adjusted using the difference between the actual and simulated values at the control depths. The above method iteratively repeats a plurality of times until the simulated log substantially matches the actual log at the control depths.

There is a need for a method of shoulder bed correction of multicomponent resistivity data so as to improve the estimated horizontal and vertical formation resistivities obtained by inversion of the shoulder-bed corrected data. Such a method should preferably computationally efficient so as to provide the necessary corrections at the wellsite and in real time. The present invention satisfies this need.

SUMMARY OF THE INVENTION

The present invention is a method for determining an applying shoulder bed corrections to logging measurements made with a transverse induction logging tool. Layer boundaries are determined from the measurements. These are combined with horizontal and vertical resistivities obtained by a whole space anisotropic inversion to give a layered model. Preferably, a Lanczos iterative procedure is used for the inversion. The shoulder bed correction for each layer is derived based upon a difference between a 1-D synthetic response of the model and a whole space response of the model at that layer. The shoulder bed correction is applied to the data and the inversion procedure is repeated. This procedure is repeated in an iterative manner until a difference between the shoulder bed corrected measurements at the center of each of the layers and a synthetic response to a whole space model at the center of each of the layers is below a predetermined threshold.

DETAILED DESCRIPTION OF THE INVENTION

Figure 1:
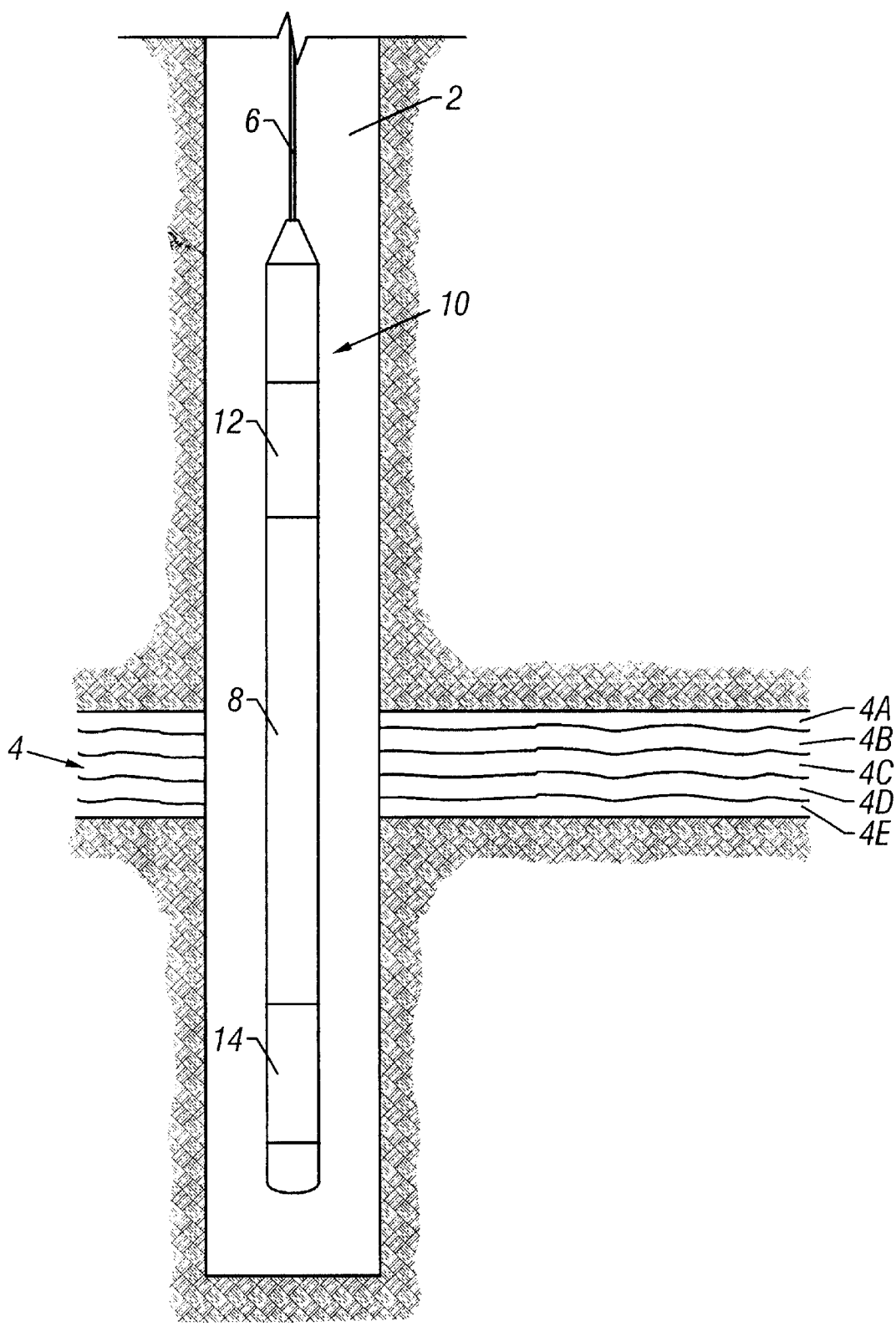
FIG. 1 shows an induction instrument disposed in a wellbore penetrating earth formations.

Referring now to FIG. 1, an electromagnetic induction well logging instrument 10 is shown disposed in a wellbore 2 drilled through earth formations. The earth formations are shown generally at 4. The instrument 10 can be lowered into and withdrawn from the wellbore 2 by means of an armored electrical cable 6 or similar conveyance known in the art, The instrument 10 can be assembled from three subsections: an auxiliary electronics unit 14 disposed at one end of the instrument 10; a coil mandrel unit 8 attached to the auxiliary electronics unit 14; and a receiver/signal processing/telemetry electronics unit 12 attached to the other end of the coil mandrel unit 8, this unit 12 typically being attached to the cable 6.

The coil mandrel unit 8 includes induction transmitter and receiver coils, as will be further explained, for inducing electromagnetic fields in the earth formations 4 and for receiving voltage signals induced by eddy currents flowing in the earth formations 4 as a result of the electromagnetic fields induced therein.

The auxiliary electronics unit 14 can include a signal generator and power amplifiers (not shown) to cause alternating currents of selected frequencies to flow through transmitter coils in the coil mandrel unit 8.

The receiver/signal processing/telemetry electronics unit 12 can include receiver circuits (not shown) for detecting voltages induced in receiver coils in the coil mandrel unit 8, and circuits for processing these received voltages (not shown) into signals representative of the conductivities of various layers, shown as 4A through 4F of the earth formations 4. As a matter of convenience the receiver/signal processing/telemetry electronics unit 12 can include signal telemetry to transmit the conductivity-related signals to the earth's surface along the cable 6 for further processing, or alternatively can store the conductivity related signals in an appropriate recording device (not shown) for processing after the instrument 10 is withdrawn from the wellbore 2.

Figure 2:
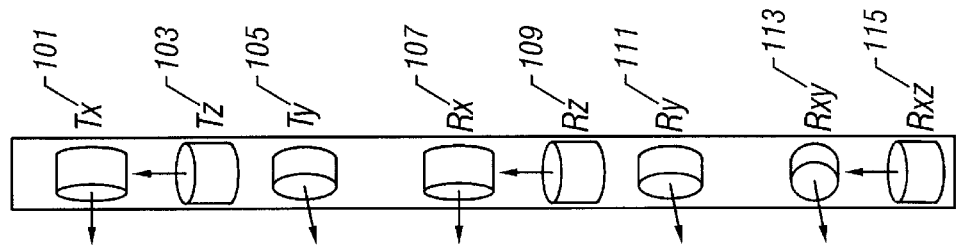
FIG. 2 shows the arrangement of transmitter and receiver coils in a preferred embodiment of the present invention marketed under the name 3DExplorer™

Turning now to FIG. 2, the configuration of transmitter and receiver coils in a preferred embodiment of the 3DExplorer™ induction logging instrument of Baker Hughes is disclosed. Three orthogonal transmitters 101, 103 and 105 that are referred to as the $T_x$, $T_z$, and $T_y$ transmitters are shown (the z-axis is the longitudinal axis of the tool). Corresponding to the transmitters 101, 103 and 105 are associated receivers 107, 109 and 111, referred to as the $R_x$, $R_z$, and $R_y$ receivers, for measuring the corresponding magnetic fields $H_{xx}$, $H_{zz}$, and $H_{yy}$. In addition, the receivers 113 and 115 measure two cross-components $H_{xy}$, and $H_{xz}$ of the magnetic field produced by the x-component transmitter.

Figure 3B:
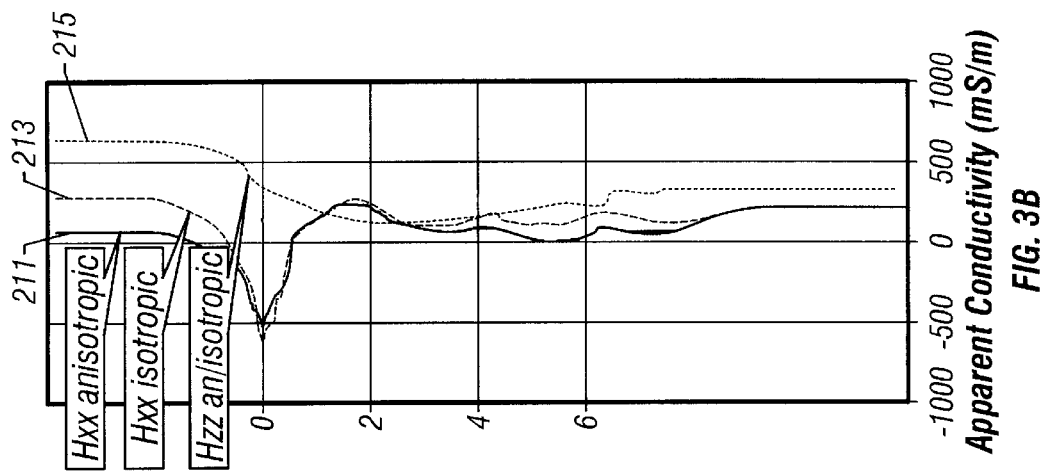
FIG. 3 shows examples of the response of some of the coils of the instrument of FIG. 3 to an anisotropic earth.
Figure 3A:
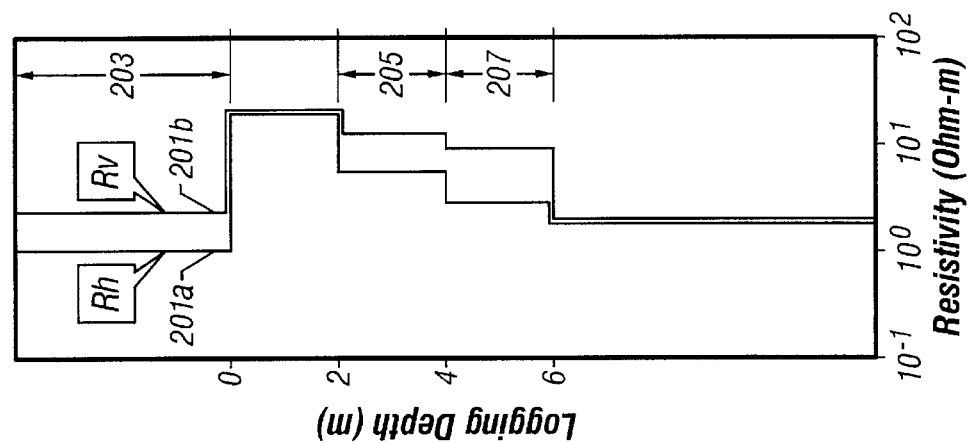

The problems with logging in anisotropic media are brought out with reference to FIG. 3. Shown on the left panel is a resistivity model with horizontal and vertical resistivities denoted by 201a and 201b. The model has three anisotropic intervals 203, 205, 207 where the vertical resistivity $R_v$ is greater than the horizontal resistivity $R_h$. The right panel in FIG. 3 shows the apparent conductivity responses for the $H_{xx}$ 211 and $H_{zz}$ 215 components. Also shown is the $H_{xx}$ component 213 if the resisitivity model is isotropic. The $H_{zz}$ response for an isotropic model is the same as for the anisotropic model.

From FIG. 3, the following observations may be made about the resisitivity responses for a vertical well in an anisotropic formation. The $H_{zz}$ curve is not responsive to anisotropy in the formation. The $H_{xx}$ curve is quite complicated and can even reverse sign close to significant resisitivity contrasts. It also may have spikes at bed boundaries. Furthermore, the $H_{xx}$ curve is not indicative of the resistive or conductive nature of a bed. Additionally, the $H_{xx}$ response exhibits more skin effect than does the $H_{zz}$ response.

Figure 4:
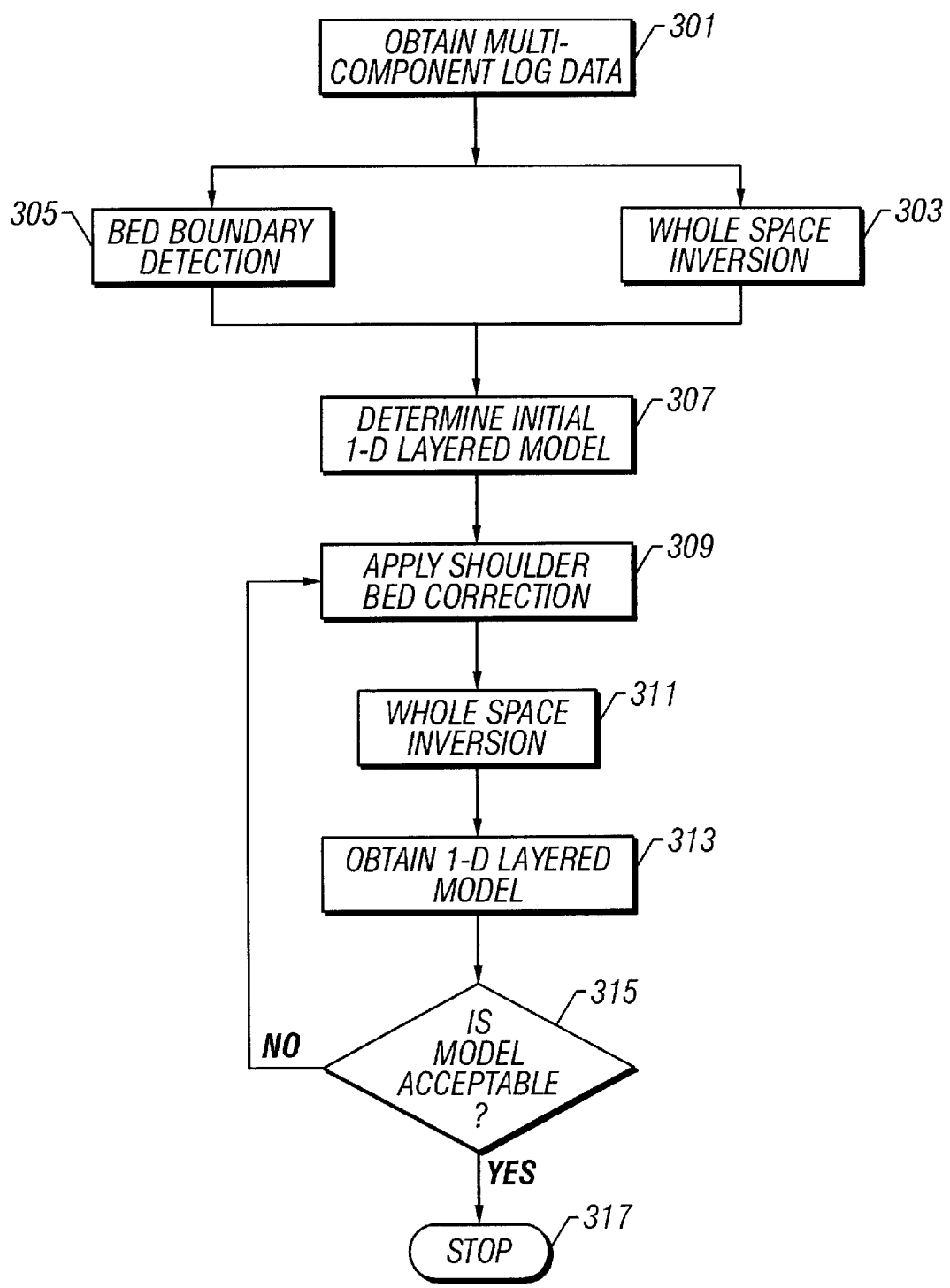
FIG. 4 shows a flow chart of a preferred embodiment of the present invention for applying shoulder bed corrections to data from a transverse induction logging tool.

Turning now to FIG. 4, a flow chart illustrating the principal steps of the present invention is shown. The first step is obtaining multi-component induction logging data. This may be done by use of the tool described above with reference to FIGS. 1 and 2 or by any other suitable instrument. These measurements are inverted using a whole space inversion 303.

In the whole space inversion, first the synthetic tool response in an isotropic 1-Ω-m whole-space model, i.e., without horizontal or vertical boundaries, is calculated. The synthetic whole-space response is then compared with measured field data at each logging depth and the horizontal and vertical resistivities ($R_h$ and $R_v$) are adjusted to match the synthetic responses with the measured field responses. In performing the match, the borehole inclination (relative to the layers) and the azimuth are required input parameters. The borehole inclination and azimuth may be obtained using a method such as is taught by U.S. Pat. No. 5,999,883 to Gupta et al., the contents of which are fully incorporated here by reference.

The model response depends nonlinearly upon a model parameter vector m comprising a plurality of layers each having an associated value of $R_h$ and $R_v$.

$$\begin{bmatrix} m_1 \\ m_2 \\ m_3 \\ m_4 \\ \vdots \\ m_{2n-1} \\ m_{2n} \end{bmatrix} = \begin{bmatrix} R_{h1} \\ R_{v1} \\ R_{h2} \\ R_{v2} \\ \vdots \\ R_{vn} \\ R_{hn} \end{bmatrix} \quad (1)$$

where n is the number of layers in the model.

The synthetic response d of a model m is related in a nonlinear manner to the model and the synthetic tool response h calculated above by a nonlinear equation of the form $$d = f(m, h) \quad (2)$$

The inversion is performed by an iterative process $$m_{k+1} = m_k + \Delta m_k \quad (3)$$

where $m_k$ is the model parameter vector at the k-th iteration and $\Delta m_k$ is the parameter update vector calculated as $$\Delta m_k = (J^T J + \alpha I)^{-1} (J^T \Delta d) \quad (4)$$

In eq. (4), J is the Jacobian or sensitivity matrix of partial derivatives of changes in the data to small changes in the parameter. The difference between the measured and the synthetic data is $\Delta d$, $\alpha$ is a regularization parameter and I is the identity matrix.

In a preferred embodiment of the invention, Eq. (4) is solved using a Singular Value Decomposition as taught by Lanczos although any other method may be used. The inversion process is extremely fast because it only involves analytical solutions of the anisotropic response as represented by eq. (2).

The obtained multi-component log data are also input to a bed boundary detection step 305. U.S. Pat. No. 5,999,884 to Kriegshauser et al. having the same assignee as the present application and the contents of which are fully incorporated herein by reference, teaches a method for estimating axial positions of formation layer boundaries from transverse electromagnetic induction signals.

In the Kriegshauser patent, a first derivative is calculated with respect to depth of the induction signals. Next, a second derivative of the signals is calculated. The second derivative is muted. Layer boundaries are selected at axial positions where the muted second derivative is non zero, and the first derivative changes sign. The selected boundaries are thickness filtered to eliminate boundaries which have the same axial spacing as the spacing between an induction transmitter and receiver used to measure the induction signals, and to eliminate boundaries having a spacing less than an axial resolution of the induction signals. The process is repeated using transverse induction measurements made at another frequency. Layer boundaries that are common to the two frequency determinations are determined to be the layer boundaries.

Alternatively, Kriegshauser discloses a frequency domain method for bed boundary determination. The induction signals are transformed into the spatial frequency domain, and low pass filtered at a band limit about equal to the axial resolution of the induction signals. The central first derivative of the filtered signals is calculated and the central first derivative inverse-transformed back to the spatial domain. Zero crossings of the inverse-transformed first derivative are indicative of formation boundaries.

The output of the inversion 303 and the output of the bed boundary detection 305 are combined to give an initial 1-D layered model of the earth. This initial model comprises the layers from 305 and associated horizontal and vertical resistivities from 303. From the initial model, the shoulder bed corrections are calculated and applied to the measurements 309.

To determine the should bed corrections, the following sub-process is carried out:

1. Calculate $D_{1Dver}$, the 1-D layered synthetic response is calculated from the initial model using the impulse response described above with reference to the whole-space inversion step 303.
2. Calculate $D_{WS}$, the whole space response at each layer using the horizontal and vertical resistivities for that layer derived in the whole space inversion 303.
3. Calculate the shoulder bed effect $\Delta D_{SB}$, the shoulder bed correction as $$\Delta D_{SB} = D_{1Dver} - D_{WS} \quad (5)$$

4. Apply the corrections $\Delta D_{SB}$ to the measurements to give $$H_{meas}^{corr, SB} = H_{meas} - \Delta D_{SB} \quad (6)$$

After applying the corrections, the whole space inversion is carried out again 311 The newly derived resistivities are then used to refine the 1-D layered model 313 in a manner similar to that described above with respect to 307; in doing so, the bed boundaries derived above at 305 are used.

A check is made to see if the model is acceptable 315. The test for acceptability is that the whole space response of the layered model at the middle of each layer should be within some predetermined threshold of the measurements shoulder bed corrected measurements. Alternatively, the iterative procedure is carried out for a specified number of iterations. If the model is not acceptable, the process iteratively goes back to 309 and steps 309–313 are repeated until either the model is acceptable or the iterative process has been carried out a predetermined number of times. If the model is acceptable, the process terminates 317 and the model may be used for subsequent petrophysical processing and interpretation. For example, water saturation may be determined for the layers in the inverted model from a knowledge of the resistivities of the layers.

The present invention has been discussed above with respect to measurements made by a transverse induction logging tool conveyed on a wireline. This is not intended to be a limitation and the method is equally applicable to measurements made using a comparable tool conveyed on a measurement-while-drilling (MWD) assembly or on coiled tubing.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of determining a parameter of interest of subsurface formations surrounding a borehole, the method comprising:

(a) conveying an electromagnetic logging tool into the borehole and using at least one electromagnetic transmitter and one electromagnetic receiver on the tool to obtain measurements related to a horizontal and vertical resistivity of the formation;

(b) obtaining a plurality of layer intervals for the subsurface;

(c) deriving a horizontal and vertical resistivity at a plurality of depths from said measurements using an anisotropic whole space model;

(d) obtaining from the derived horizontal and vertical resistivities a layered model;

(e) deriving shoulder bed corrections based upon the layered model and the whole space model; and (f) determining from said whole space model and said shoulder bed corrections an updated layered model.

2. The method of claim 1 wherein said electromagnetic logging tool is conveyed one one of (i) a wireline, (ii) a drillstring, and (iii) coiled tubing.

3. The method of claim 1 wherein the parameter of interest is at least one of (i) a horizontal resistivity of one of said layers, (ii) a vertical resistivity of one of said layers, (iii) a fluid saturation of one of said layers.

4. The method of claim 1 wherein deriving said horizontal and vertical resistivity at said plurality of depths further comprises performing a whole space inversion.

5. The method of claim 4 wherein performing a whole space inversion further comprises computing a synthetic tool response.

6. The method of claim 4 wherein performing a whole space inversion further comprises updating estimates of said horizontal and vertical resistivity using a Lanczos procedure.

7. The method of claim 1 wherein obtaining said plurality of layer intervals further comprises determining a first and a second derivative with respect to depth of said measurements.

8. The method of claim 1 wherein obtaining said plurality of layer intervals further comprises:

(i) Fourier transforming said signals into the spatial frequency domain;

(ii) low pass filtering said Fourier transformed signals at a cutoff about equal to an axial resolution of said induction signals;

(iii) calculating a central first derivative of said filtered Fourier transformed signals;

(iv) calculating an inverse Fourier transform of said central first derivative;

(v) selecting roots of said inverse Fourier transformed central first derivative; and (vi) testing localized properties of said inverse Fourier transformed central first derivative within a selected number of data sample points of said roots, thereby providing indications of formation layer boundaries at axial positions most likely to be true ones of said formation layer boundaries.

9. The method of claim 1 wherein deriving shoulder bed corrections further comprises:

(i) determining a layered synthetic response calculated from the layered model;

(ii) determining a whole space response using said horizontal and vertical resistivities; and (iii) obtaining said shoulder bed correction as a difference between said layered synthetic response and said whole space response.

10. The method of claim 9 wherein said layered synthetic response is a 1-D response.

11. The method of claim 9 wherein determining said layered synthetic response further comprises using an impulse response.

12. The method of claim 1 wherein determining said updated model further comprises:

(i) applying the shoulder bed corrections to said measurements to obtain shoulder bed corrected measurements;

(ii) determining a difference between said shoulder bed corrected measurements at centers of each said plurality of layers and a synthetic response of the whole space model at said centers.

13. The method of claim 12 further comprising iteratively modifying said model until said difference is less than a predetermined threshold.

* * * * *